United States Patent [19]
Emanuel

[11] 3,899,419
[45] Aug. 12, 1975

[54] METHOD FOR CHEMICAL FRACTIONATION, DEFATTING AND DEWATERING OF SOLIDS AND SUSPENSIONS

[75] Inventor: Carl F. Emanuel, Bellevue, Wash.

[73] Assignee: Resources Conservation Co., Renton, Wash.

[22] Filed: June 21, 1974

[21] Appl. No.: 481,757

Related U.S. Application Data

[63] Continuation of Ser. No. 288,872, Sept. 13, 1972, abandoned.

[52] U.S. Cl. ................... 210/22; 210/59; 210/67; 260/112 R; 210/10; 426/364; 426/429; 426/489
[51] Int. Cl.$^2$ ....................................... B01D 11/00
[58] Field of Search ............ 210/21, 22, 59, 66, 67, 210/65, 10, 73; 71/121, 16, 21; 260/112 R; 426/429, 426, 364, 443, 489, 478, 495, 490

[56] References Cited
UNITED STATES PATENTS

| | | | |
|---|---|---|---|
| 2,943,983 | 7/1960 | Bernhauer et al. | 99/2 |
| 3,088,909 | 5/1963 | Davison et al. | 210/22 |
| 3,177,139 | 4/1965 | Kimberlin et al. | 210/22 |
| 3,718,451 | 2/1973 | Baumann | 71/21 |

OTHER PUBLICATIONS

Zeitoun A. et al., "Solvent Extraction of Secondary Waste Water Effluents: etc.", W.P.C.F., Vol. 38, No. 4, pp. 544–554.

*Primary Examiner*—Samih N. Zaharna
*Assistant Examiner*—Benoit Castel
*Attorney, Agent, or Firm*—Bacon & Thomas

[57] ABSTRACT

A process for dewatering solid matter containing bound or unbound water comprises mixing the solid matter with an amount of a composition having an inverse critical solution point in a two-phase system with water. The amount of the composition used must be sufficient for substantially all of the bound or unbound water in the solid matter to be completely miscible in a single phase in the composition at or below a first predetermined temperature. The temperature of the mixture is then adjusted to or below the predetermined temperature. The mixture is then mechanically separated, as by filtering, into a solid fraction containing the solid matter and a liquid fraction containing the composition and substantially all of the water. The liquid fraction is separated into water and the composition by raising the temperature of the liquid fraction to above the determined temperature, at which temperature the liquid fraction separates into two liquid phases. The composition phase is then decanted from the water phase, after which the composition phase can be recycled for dewatering additional solid matter. The preferred compositions are those secondary or tertiary amines, preferably aliphatic, which exhibit an inverse critical solution point in a two-phase system with water. Mixtures of these amines can be used. Most preferred of these secondary and tertiary amines are those having the formula $$\begin{array}{c} R_1 \\ | \\ N-R_2 \\ | \\ R_3 \end{array}$$

wherein, $R_1$ can be hydrogen or alkyl, $R_2$ and $R_3$ can be alkyl radicals having one to six carbon atoms or alkenyl radicals having two to six carbon atoms, the total number of carbon atoms in the amine molecule being in the range of from three to seven, inclusive. An exemplary and preferred amine of this class is triethylamine. The solid matter to which this method is applicable includes a wide variety of materials including fecal matter (poultry feces and treated sewage sludge), other sludges (flocculant metal processing wastes), animal protein (egg white, whole eggs, whole fish, fish wastes, shellfish and shrimp wastes, and whole milk), and plant protein (spent brewer's yeast, and green plants).

47 Claims, 2 Drawing Figures

METHOD FOR CHEMICAL FRACTIONATION, DEFATTING AND DEWATERING OF SOLIDS AND SUSPENSIONS

This application is a continuation of application Ser. No. 288,872, filed Sept. 13, 1972, and now abandoned.

BACKGROUND OF THE INVENTION

The present invention relates to dewatering of solid matter containing bound and/or unbound water.

Many industrial and agricultural processes produce water containing waste matter, the solids content of which is valuable. These solids are presently unused because present technology renders them unrecoverable or because the economical feasibility of such recovery is negative. Processing wastes falling into this category at present are usually disposed of in a conventional manner. some of the processing wastes, due to their toxicity or their effect on the environment must be especially treated prior to disposal or disposal itself must be handled in a special manner. The cost of waste matter treatment and disposal is quite high, adding to the cost of processing the primary product of which the waste matter is a byproduct. Furthermore, discarding valuable and usable material is a direct and unnecessary depletion of natural resources without derivation of any benefit to society.

One example of an agricultural waste which contains valuable material which can be reused not only in the same industry but which contains other materials which are valuable starting materials for other unrelated industries, is the poultry feces produced by poultry in meat raising and egg laying operations. Presently, large quantities of poultry feces are discarded by trucking to disposal sites. It is known that poultry feces contain valuable unused poultry food and other valuable byproducts of the digestive process of the poultry. Approximately 25% of the food ingested by the poultry remains unused and thus appears in the poultry feces. It has been suggested that the poultry feces be dewatered to recover the solids therein, which solids can then be further processed to remove true excretory products, retailored and then refed to the poultry.

It of course would be desirable to be able to dewater poultry feces and other water containing solids by filtration processes. Unfortunately, however, poultry feces and most other industrial wastes, and especially proteinaceous animal and plant matter, contain physically bound, unbound and weakly chemically bound water. This water is not removable by conventional filtration or other mechanical separation techniques; therefore, prior dewatering methods have used heating or distillation techniques. Even the unbound water often cannot be removed because of the very high viscosities of the wastes.

One such process has been effective wherein the water is evaporated from poultry feces by heating. This process produces a valuable food product in the dried particulate matter which can be fortified and refed to the poultry. As is known, the caloric expenditure in evaporating large quantities of water is quite high due to the heat capacity and heat of vaporization of water. Despite the large caloric expenditure, it has been shown that recovery of the food from poultry feces can be made economical when the cost of disposal of the feces is considered along with the savings in new food costs. This method does not, however, remove true excretory products (toxic) from the recovered product to be refed.

It is also known that poultry feces contain other valuable byproducts such as urea, uric acid and vitamin $B_{12}$, among others, which also have valuable end uses. These additional components can be removed from the solid matter prior to the heating process and can be further treated to produce other valuable products.

In the search for other ways of making the above dewatering process more economical and promoting recovery of further byproducts, a novel method of removing water from solid matter containing bound and unbound water and other soluble components has been found. It is therefore an object of the present invention to provide a method by which water can be removed from solid matter containing bound and unbound water without expending a large amount of heat. It is a further object of the present invention to remove other components from the solid matter which are soluble in water and to remove fatty materials and other molecular materials such as vitamins from the solid matter. Further objects of the present invention are to remove water and other materials from fecal matter, including sewage sludge, to remove water and other materials from industrial waste sludges, to remove water from animal protein, and to remove water from plant protein.

Additional objects of the present invention are: to provide a process by which water can be economically removed from heat sensitive materials; to provide a dewatering composition which physically combines with bound and unbound water in solid matter to render the solid matter mechanically separable at ambient or near ambient temperatures; to provide a process by which the solid matter containing water can be divided into a liquid fraction and a solid fraction, the solid fraction being substantially completely free of water, the liquid fraction being separable into a dewatering composition fraction and a water fraction; to provide a process by which the dewatering composition can be recycled to dewater additional solid matter.

SUMMARY OF THE INVENTION

The present invention therefore broadly provides a method for removing water from a mixture comprising solid matter and bound or unbound water, comprising contacting the mixture with an amount of a composition sufficient for substantially all of the water in the mixture to be completely miscible in a single phase in the composition at a first predetermined temperature, the composition having an inverse critical solution temperature in a two-phase system with water, mechanically separating the mixture and the composition into a solid fraction comprising the solid matter and a liquid fraction comprising a major portion of the water and the composition while maintaining the temperature of the composition in the mixture at least as low as the first predetermined temperature. More particularly, the present invention provides a method for dewatering fecal matter, flocculant industrial sludges, proteinaceous animal matter, and proteinaceous plant matter.

The dewatering composition comprises preferably a secondary or tertiary amine which exhibits an inverse critical solution temperature. More particularly, the dewatering composition comprises a member of or mixtures of members of the group of amines having the formula

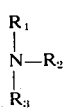

wherein, $R_1$ can be hydrogen or alkyl, $R_2$ and $R_3$ can be alkyl radicals having from one to six carbon atoms or alkenyl radicals having two to six carbon atoms, the total number of carbon atoms in the amine molecule being in the range of from three to seven, inclusive.

BRIEF DESCRIPTION OF THE DRAWINGS

A better understanding of the present invention can be acquired by reading the ensuing specification in conjunction with the accompanying drawings wherein.

DESCRIPTION OF PREFERRED EMBODIMENTS

Figure 1:
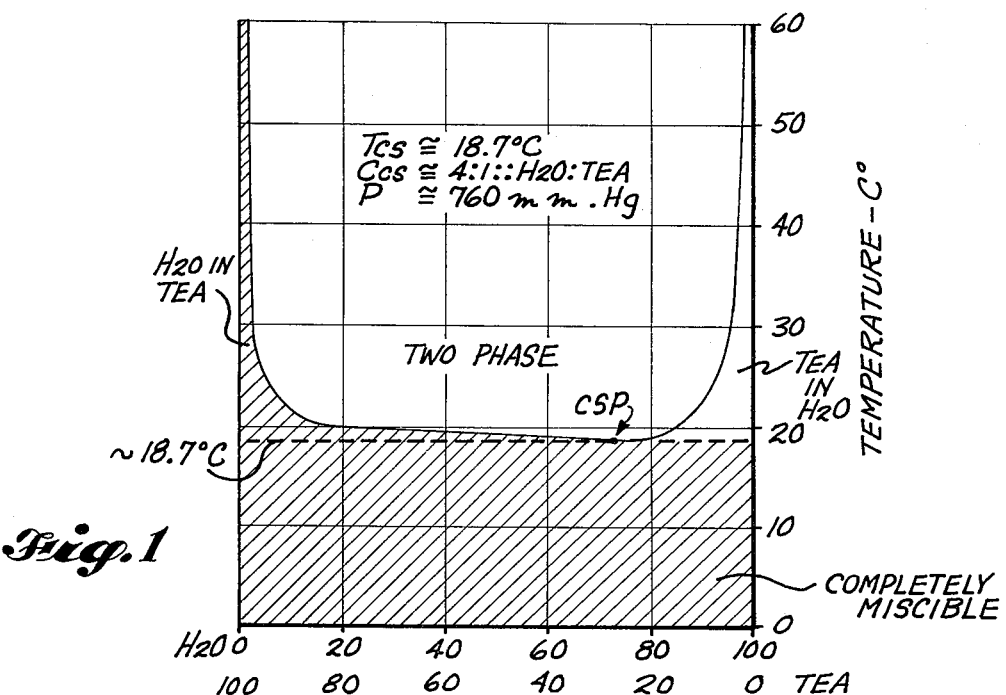
FIG. 1 is a phase diagram of a preferred dewatering composition, triethylamine, showing in shaded portion the effective compositional and temperature requisites of the present invention.

The basic process of the present invention requires relatively few steps to accomplish the intended purpose of removing water from solid matter containing bound or unbound water. Solid matter containing bound and unbound water is preferably mixed with a composition having an inverse critical solution point to form a slurry. The slurry is preferably lowered to below the inverse critical solution temperature so that the composition and water will form a single phase in which the water is completely miscible in the composition. The slurry is filtered or otherwise mechanically separated to form a solid fraction containing the solid matter and a liquid fraction containing the single phase including the composition and the water (and other materials soluble in water or the composition). The solid fraction can then be further processed if desired. The single phase liquid fraction is then heated to a temperature above the critical solution temperature forming a liquid-liquid two phase system comprising a water phase with a small amount of the composition in it and a composition phase containing a small amount of water. This composition phase with its included water can be recycled for dewatering of additional solid matter.

As used herein, the term mixture is used to define the original starting material to be dewatered or defatted. The mixture usually contains solid matter in particulate or finely divided form, or may contain macromolecular solids in true solution for example, egg whites. The solid matter can include both particulate macromolecular material and micromolecular material. The macromolecular material referred to is that solid matter having a relatively large molecular structure, e.g., a molecular weight of about 10,000 or greater, such as protein, polysaccharides, nucleic acids and the like. The micromolecular material referred to is that matter having a smaller molecular structure and weight such as uric acid, urea, inorganic salts and the like. The solid matter which is mechanically separated from the mixture by the present invention can be insoluble in water, insoluble in the dewatering composition, or can be soluble in either one or both water and the composition.

The term mixture as used herein further includes water in either bound or unbound form. The term bound water as used herein is that water in solid matter which exerts a vapor pressure less than that of pure water at a given pressure and temperature. The water may become bound by retention in small capillaries, by solution in cell or fiber walls, by homogeneous solution throughout the solid, by physical adsorption on solid surfaces, and can include hydrated water and water of crystallization which is bound by hydrogen bonds to solid matter such as the water bound to proteinaceous material by hydrogen bonds. unbound water is that water in excess of the equilibrium water content corresponding to saturation humidity. Water which is both bound and unbound can be removed by the process of the present invention.

It is also within the purview of the present invention to remove other materials soluble in the composition and/or water phases. For example, some micromolecular materials such as uric acid and urea can be removed from the solid matter by dissolution in the single phase liquid fraction of water and composition. Micromolecular materials such as fatty acids and other lipids can also be removed since they are very soluble in the composition fraction, e.g., in triethylamine.

A slurry as used herein is a combination of the mixture defined above and the dewatering composition. In the preferred form of the invention, the solid matter in the mixture is in particulate form such that good dispersion of the solid matter in the slurry occurs. This will aid in two respects. Firstly, when the solid matter is finely divided, better contact between the solid matter and the dewatering composition therein is obtained, thus increasing the amount of water separated from the solid matter. Secondly, mechanical separation of the solid matter from the slurry is expedited since the dewatering composition has a low viscosity and good liquid flow can be accomplished through the interstices of the particulate solid matter. It is intended that the term slurry be defined broadly enough so that as used herein it encompasses the combination of water, the dewatering composition, and insoluble and/or soluble solid material, whether or not the solid material is finely divided.

In accord with the present invention, the dewatering composition is one which exhibits an inverse critical solution point (CSP) in a two-phase system with water. Preferably, the composition exhibits this point at or near atmospheric pressure and prevailing ambient temperature or, most preferably, room temperature. Below inverse critical solution point water and the solvent composition are completely miscible in all proportions. Above the inverse critical solution point the solvent composition and water will separate into two phases. One phase will be primarily the solvent composition with a lesser amount of water in solution therewith; the other phase will be primarily water with an amount of the solvent composition dissolved therein.

One class of compounds which exhibit an inverse critical solution temperature are certain of the secondary and tertiary amines. Thse amines can be used by themselves or in admixture with each other in the process of the present invention. By choosing one amine or a mixture of two or more amines the solvent composition can be tailored to appropriately suit the optimum process parameters for a given water-solid separation.

A particularly useful and preferred class of amines which can be used with the present invention are those amines which comprise a member of or mixtures of members of the group having the formula

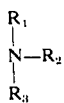

wherein $R_1$ can be hydrogen or alkyl, $R_2$ and $R_3$ can be alkyl radicals having from one to six carbon atoms or alkenyl radicals having two to six carbon atoms, the total number of carbon atoms in the amine molecule being in the range of from 3 to 7, inclusive, the amine exhibiting an inverse critical solution temperature in a two phase system with water. Examples of compounds within this class that can be used in accord with the present invention are listed below:

Triethylamine
Diisopropylamine

Of the above amines, the most preferred is triethylamine. Triethylamine exhibits an inverse critical solution point at a critical solution temperature ($T_{cs}$) in the neighborhood of 18.7°C. at a pressure of 760 mm. of Hg. Shown in FIG. 1 is a phase diagram of triethylamine and water. The critical solution concentration ($C_{cs}$) is on the order of 25% triethylamine to 75% water, or approximately a 3:1 ratio of water to TEA. As shown in FIG. 1 and described above, the data on the inverse critical solution temperature and composition are approximations, relaying the best available data. It has been found that little study has been conducted on the secondary and tertiary amines and especially their properties in solutions with water. It is, however, known that these amines as a class described and set forth above do exhibit an inverse critical solution point. Triethylamine is preferred as the dewatering composition since it exhibits its inverse critical solution temperature at about 18.7°C. This temperature is very near average atmospheric ambient operating conditions (approximately 23°C.). Thus, a relatively small amount of energy is required to reduce a triethylamine-water system to a temperature below the inverse critical solution temperature so that the two components will become completely miscible.

The exact molecular or lattice phenomenon resulting in the inverse critical solution properties and in the miscibility with water and other composition is not known of TEA or the other secondary and tertiary means. For purposes of the present invention, however, it is preferred that the predetermined temperature be at least as low as, and most preferably, below the inverse critical solution temperature. For TEA the predetermined processing temperature resides at or below 18.7°C. Of course, the inverse critical solution temperature may be slightly affected, usually downwardly, by the salts or other materials in the solid matter which may go into solution with the water and TEA. For any given liquid and solid system, within the purview of this invention, however, there is a predetermined temperature below which the liquid fraction will be completely miscible.

In order to effect mechanical separation of a slurry or mixture into a solid fraction and a liquid fraction containing the solvent composition and water, the liquid fraction must be maintained as a single phase during the separation. If during separation the liquid fraction is allowed to separate into two phases, (i.e., if the temperature is allowed to exceed the predetermined temperature), some of the water present will recombine with the solid fraction to produce a bound water condition, thus preventing complete removal of water by the present process. Thus, to effect complete removal of both the unbound and bound water, mechanical separation, as by filtration, must be effected within the shaded area shown in FIG. 1.

One of the primary purposes of the present invention is to remove substantially all water from a mixture containing solid matter and bound and unbound water. Mechanical separation of solid matter will best occur under conditions at which the water is completely miscible in the dewatering composition, resulting in the removal especially of bound water from the mixture. of course, complete miscibility of water in the dewatering composition will occur at temperatures below the inverse critical solution temperature. Bound and unbound water can also be removed from a mixture by the present invention at temperatures above the inverse critical solution temperature, but at temperatures below that at which phase separation of water and the dewatering composition will occur. However, the liquid phase in the latter situation must be a water in dewatering composition solution. This occurs when the amount of the dewatering composition present relative to water exceeds the amount of dewatering composition present at the critical solution concentration. Thus, referring to FIG. 1, at concentrations and temperatures in the area in the phase diagram below the dotted line, which intersects the inverse critical solution temperature, substantially complete removal of bound and unbound water from the mixture will result. Furthermore, at the temperatures and concentrations in the shaded area to the left of the phase curve and above the dotted line wherein the concentration of the dewatering composition exceeds the critical solution concentration, removal of bound and unbound water from the mixture can also be effected since water present will be completely miscible with the dewatering composition. Proportions of the composition to water in the range of about 1 to 7 parts by weight of composition to one part by weight of water may be used.

The dewatering process of the present invention has wide applicability. As related to the background of the invention, the present invention is capable of dewatering fecal matter either in raw form as excreted or in a treated form such as the end product sludge from a sewage treatment plant. The present invention can also be utilized to dewater other industrial processing wastes, for example, an aqueous sludge containing nonfilterable flocculated metal salts, particularly hydroxide salts. The present invention can further be utilized to dewater proteinaceous material, such as green plant protein, for example fresh green plants, specifically the species commonly known as the duckweed, and other forms of plant material such as spent brewer's yeast which remains after the fermentation process utilized in producing beer. By green plants it is meant chlorophyll-containing plants. It has furthermore been found that the present process is applicable to the dewatering of proteinaceous animal solids and particularly for the isolation of animal protein. A variety of animal protein has been effectively dewatered by using the present process, for example the protein retained on eggshells as they are separated from fresh whole eggs, egg whites, whole eggs, fish protein including both food processing waste and whole fish, shellfish wastes, specifically shrimp wastes, and milk.

Figure 2:
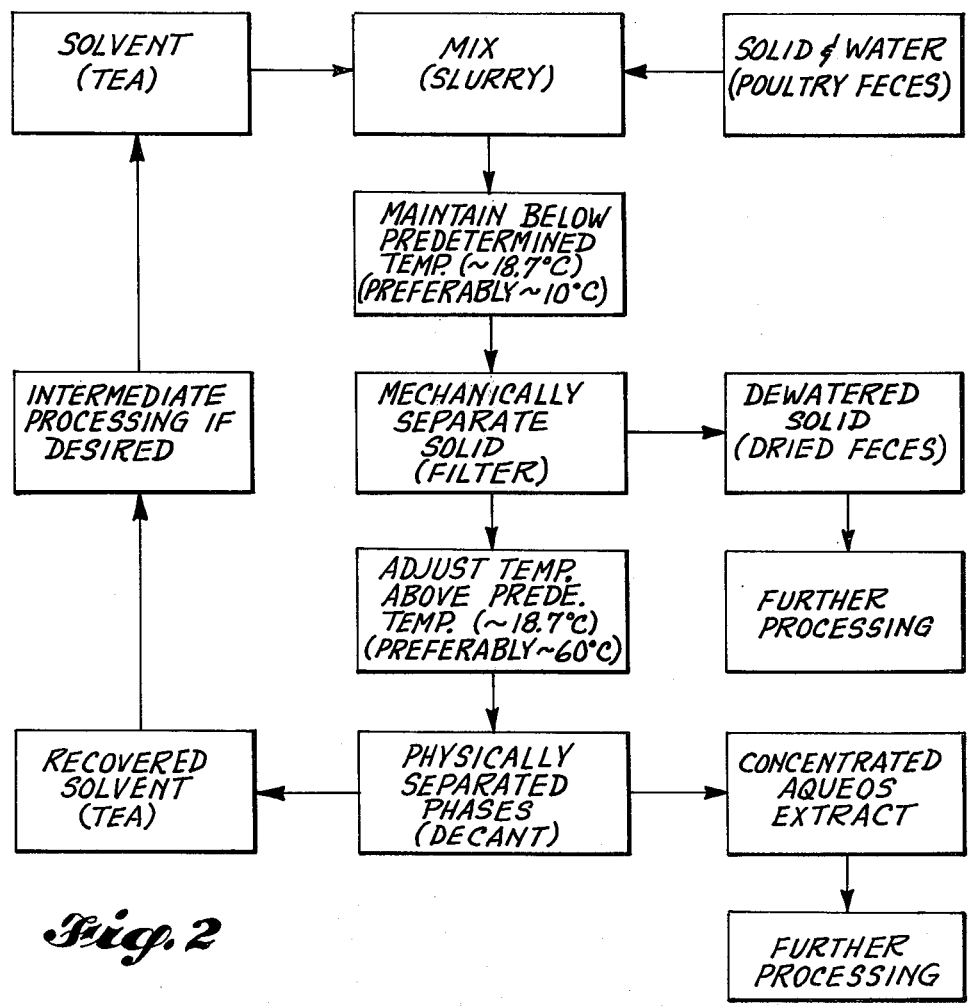
FIG. 2 is a flow diagram showing a preferred process in accord with the present invention.

Referring now to FIG. 2, a preferred process in accord with the present invention will be described in conjunction with the flow sheet. with reference to the flow sheet, the primary legends refer to the overall process in general whereas the parenthetical legends refer to specific components, temperatures, and the like utilized in a preferred process. Firstly, the mixture of solid matter and unbound and bound water are placed in a container and combined with an amount of dewatering composition (or solvent) sufficient to be completely miscible with the water in the mixture at or below the predetermined temperature. In a preferred form of the invention, the solvent is triethylamine (TEA). When dewatering poultry feces, it is preferred that the TEA and feces be sufficiently mixed to produce a slurry in which the solid matter in the mixture is finely divided ans substantially suspended in the TEA. The slurry is then lowered to a temperature below the predetermined temperature, approximately 18.7°C. for TEA, and preferably to about 10°C. for the TEA poultry feces slurry. The slurry is then mechanically separated into a dewatered solid fraction and a liquid fraction.

According to a preferred embodiment of the invention, the slurry is filtered across a suitable filter, the size of which is dependent upon the size of the particulate matter in the slurry. The solid fraction is retained on the filter whereas the liquid fraction passes through to become the filtrate. It is important that the mechanical separation be conducted at a temperature at or below the predetermined temperature, in the case of the TEA-poultry feces slurry it is preferred that the filtration temperature be maintained in the vicinity of 10°C.

The dewatered solid fraction can then be moved to other processing zones for further processing. For example, nutritional additives can be combined with the dewatered poultry feces fraction to bring them up to nutritional level equivalent with original poultry feed. Thereafter the dried feces can be refed to the poultry.

The liquid fraction, the filtrate in the preferred embodiment, is then transferred to another process zone where the temperature of the filtrate is adjusted to above the predetermined temperature. In the case of TEA, the temperature is raised above 18.7°C. As the temperature is so raised, the liquid fraction will separate into two phases, one phase being a TEA in water phase and the other phase being a water in TEA phase. The water phase and composition phase (TEA) are then mechanically separated into two portions corresponding to each of the phases. This can be accomplished by utilizing conventional large scale separation techniques. In the laboratory separation is accomplished by decanting or in a separatory funnel. It has been found for the TEA-water system that a temperature of between 50°C. and 60°C. is optimum for maximum separation of the TEA from the water. For the TEA-water system within this temperature range, a very small percentage of each component is retained in the respective phase composed primarily of other components.

The dewatering composition phase TEA is then returned to the starting point of the process to be reutilized in producing additional slurries. The percentage of water retained in the TEA returned to the head of the process is on the order of 2 to 5 per cent when the phase separation is conducted in the range of 50°C. to 60°C. This amount of water in the solvent composition is negligible when compared to the overall water removed from the original solid matter water mixture and can be parasitically recycled without detriment to the overall process.

If there are present in the original mixture other components which are soluble in the solvent composition (TEA), the recovered solvent can be processed prior to its return to the head of the process line. For example, if there are any oils or fatty macromolecular materials present in the original solid mixture, they will go into solution and be retained by the solvent or composition fraction. Such fats or oils can be removed from the solvent fraction by conventional methods such as distillation.

The concentrated aqueous extract, or water phase of the liquid fraction, can be further processed for disposal. If it is desired to recover nearly all of the TEA, the residual TEA present in the water phase can be removed by steam stripping. In many instances the original solid mixture will contain additional liquid or solid components which are soluble in water. These components will appear in the water phase and can be removed by conventional processing techniques. These water soluble materials can be removed by further processing to produce an essentially pure water phase which can be used or discarded as desired.

Fecal matter, and especially poultry feces, contain additional components which can be isolated by utilizing the dewatering process described above. Poultry feces, for example, contain uric acid and vitamin $B_{12}$ in significant amounts. For example, about 2% (wet weight basis) of uric acid is present in poultry feces. The preferred class of solvent compositions and especially triethylamine, have additional properties which enable its use in the separation of the above components from poultry feces or other fecal matter. TEA is a strong base and exhibits nonpolar as well as polar properties. The strongly basic nature of TEA enables the isolation of acidic materials from the fecal matter. TEA will form a salt with the acid to be isolated. When the liquid fraction including the water and solvent composition is separated from the fecal matter, the acid-TEA salt wall be present in the liquid fraction. When the single phase TEA-water solution is warmed, the TEA-acid salt will quantitatively migrate to the water phase, if the acid is of a polar nature (for example, uric acid) or will be retained entirely in the TEA phase, if the acid is substantially nonpolar (for example, fatty acids). Thus, the separate water phase can be further processed to isolate uric acid, resulting in a valuable byproduct of the dewatering process. For example, when the aqueous layer is acidified with a mineral acid, approximately 90% (based on amount originally present in feces) recovery of uric acid is effected by precipitation of free uric acid out of the aqueous layer. This process is effective when applied to poultry feces and other materials containing water soluble, polar, organic acids.

Other polar substances such as ureides, amino acids, vitamins (such as vitamin $B_{12}$) sugars and other similar polar organic compositions will also all ultimately reside in the water phase. The isolation of each of these substances from the water phase will be somewhat different in each case, but can be effected by suitable methods known in the art.

The nonpolar properties of the preferred class of amines, and especially TEA (due to the aliphatic groups), will cause dissolution of neutral fats (e.g., steroids such as cholesterol) and lipids in the TEA. In an original mixture containing solid particulate matter, fat, and bound and unbound water, to which TEA or one of the other class of preferred amines is added, the particulates can be removed by filtration of the cold mixture. When the filtrate is warmed the water phase can be separated leaving a TEA phase containing fatty materials in solution. Low temperature distillation or extraction with a low boiling point solvent (such as hexane) will recover the TEA for recycling, leaving the concentrated lipids behind for further purification in a conventional manner. This isolation process is applicable to specific fat soluble materials such as chlorophylls, carotins, animal fats, cholesterol, bile acids, petroleum products and certain plant fats. The same fat isolation process is also applicable to separation of fish oils, prostaglandins, soybean, cotton and peanut oils and similar fatty materials.

EXAMPLES

A number of specific examples of the present invention will follow. These examples are intended as working emobidments to illustrate the broad applicability of the invention and to teach one of ordinary skill in the art how to reproduce the invention. They are not intended to delimit the present invention in any manner, but are intended to provide a basis for showing the broad efficacy of the invention.

EXAMPLE I 10.7 grams of poultry feces are mixed with 30 milliliters (ml.) of triethylamine (TEA). A slurry of TEA and poultry feces is formed after five minutes of vigorous mixing by hand. The temperature of the slurry is lowered to about 10°C. The slurry is filtered through a No. 1 Whatman filter paper by placing the filter paper in a chilled filtration funnel with a suitable retention plate. The filter funnel is inserted into a vacuum flask and a vacuum of approximately 26 inches of mercury is pulled within the flask. The chilled slurry is poured onto the filter paper in the funnel. The vacuum is continuously pulled on the flask until substantially all of the liquid is removed from the solid fraction remaining on the filter paper. The liquid fraction is retained in the flask. About 2.12 grams of dry particulate solid matter are recovered from the filter paper.

The liquid fraction or filtrate is allowed to stand until its temperature increases to room temperature, approximately 23°C. A dark lower aqueous phase and a light yellow upper TEA phase forms. The filtrate is placed in a separatory funnel. The aqueous phase is emptied into a graduated cylinder and measured. About 8 grams of water are recovered. About 29 ml. of TEA are recovered in the TEA phase. By assay it is determined that the dried particulate matter has the analysis shown in Table I, along with a comparison with commercial chicken feed. Thus it can be seen that dried poultry feces when retailored (or recompounded) can be used as food for the poultry.

A five ml. sample of the water phase is placed in a flask and titrated with 1.25 ml. of ammonium phosphate. A precipitate forms and is separated from the water phase by centrifugation. The precipitate weighs 45.5 mg. and is identified as ammonium urate. This is equivalent to 39.5 mg. of uric acid.

TABLE I

| | COMPOSITION OF POULTRY FEEDS | |
|---|---|---|
| | "RECOVERED FOOD"* (TEA Process) | POULTRY FEED* (Commercially compounded) |
| Phosphorus | 2.88% | 0.94% |
| Sulfur | 0.33% | 0.16% |
| Calories (Bomb Calorimetry) | 3.14 cal/gm | 3.92 cal/gm |
| Protein | 40.1% | 19.5% |
| $H_2O$ | 2.5% | 2.6% |
| Ash | 25.8% | 10.0% |
| Fiber | 10.7% | 2.5% |
| Carbohydrate | 19.7% | 61.5% |
| Fat | 1.1% | 4.0% |

*All percentage figures are by weight.

EXAMPLE II

The procedure of Example I is repeated utilizing 100 grams of hen feces. 500 ml. of TEA are utilized to form a slurry with the hen feces. This represents an approximate 5 to 1 volume ratio of TEA to sample. The temperature of the slurry is lowered to about 10°C. The slurry is vacuum filtered through a Whatman No. 1 filter paper. The liquid fraction is then heated to 54°C. and the water phase separated from the TEA phase. Approximately 430 ml. of TEA are recovered, representing an 86% recovery relative to original TEA used. Approximately 48 ml. of water are recovered in the water layer. About 22 ml. of water ( or 5% by volume) are retained in the TEA layer. The filtration time is approximately seven minutes yeilding an easy filtration of the sample. The weight of the solids recovered on the filter paper is approximately 21.5 grams. The solids are weighed after removing any residual TEA in the solid by heating to a temperature of 75°C. and maintaining it there for approximately 5 minutes. The solids appear fibrous with a tan color.

EXAMPLE III

The procedure of Example II is repeated, this time substituting diisopropylamine for the triethylamine. The remaining components, procedures and parameters are the same. The results are substantially the same.

EXAMPLE IV

A sample of sewage sludge obtained from the effluent of a municipal anaerobic sewage digester is placed in a centrifuge. The sludge is concentrated in the centrifuge from about 5% by weight to about 50% by weight of solids. 100 grams of the concentrated sludge is mixed with 300 ml. of TEA to form a slurry. The temperature of the slurry is lowered to about 10°C. and vacuum filtered through a Whatman No. 1 filter paper as described above. About 50.8 grams of solids are retained on the filter paper. The filtration time is about two minutes. The solids are thoroughly dried in an oven leaving about 49.6 grams of residue.

About 263 ml. of filtrate are recovered. The filtrate is then placed in a beaker and heated until the filtrate boils at a temperature of about 90°C. near the boiling point of TEA. The TEA is completely vaporized from the filtrate leaving about 30 ml. of residue. The residue is identified as petroleum based and represents crankcase oil and the like which was not biodegraded during the sewage treatment process.

EXAMPLE V

Approximately 100 grams of raw hen feces are placed on a Whatman No. 1 filter paper. The filter paper is placed in a filtration funnel which is in turn positioned in a vacuum flask for drawing a vacuum on the lower portion of the filtration funnel. A vacuum of approximately 26 inches of mercury is drawn on the vacuum flask for a period of about 7 minutes. The filter paper and hen feces are then removed from the filtration funnel and weighed. Discounting the weight of the filter paper, the feces weigh slightly less than 100 grams. Thus, by direct vacuum filtration substantially no water is removed from the hen feces although the actual water content is about 78% by weight.

EXAMPLE VI

A 100 gram sample of chicken egg shell freshly separated from the whole egg is placed in a container. A layer representing residual albumen and keratin-protein membrane adheres to the interior of the shell after it is broken. The egg shell sample is combined with 300 cc. of TEA. The mixture is homogenized in a high shear blender. The slurry (or homogenate) is cooled to 10°C. and filtered through a Whatman No. 1 filter paper on a funnel, placing the filtration side of the funnel under a vacuum of 26 inches of mercury. The filtration is accomplished very easily. The filtrate temperature is then raised to approximately 54°C., at which temperature the filtrate has separated into two phases. The TEA phase contains 252 milliliters (approximately 84% by volume of original TEA); the water phase contains 27 milliliters. The filtration time is less than 2 minutes. The solid matter recovered after driving off residual TEA by heating at 75°C. for 10 minutes is 78.1 grams and is composed of protein and shell mineral (primarily calcium carbonate).

EXAMPLE VII

The procedure of Example VI is repeated utilizing 174 grams of egg white, representing the white of six average size chicken eggs. 500 grams of TEA are used to form a slurry with the egg white. The slurry is easily vacuum filtered over a Whatman No. 1 filter paper resulting in a 20.6 gram recovery of solid matter. 385 cc. of TEA are recovered by raising the filtrate to a temperature of 54°C. and allowing the phases to separate. This represents a 77% by volume recovery of original TEA. In this example, 220 milliliters are recovered in the water phase. (This latter numerical value should be discounted since the erroneous result is either attributable to experimental error or the possibility that an inordinate amount of TEA was still in the water phase.) The color of the solid matter is lemon yellow. The solid matter is very brittle.

EXAMPLE VIII

The procedure of Example VI is repeated utilizing 215 grams of egg white and yoke representing five chicken eggs. 600 grams of TEA are utilized to form a slurry with the egg. The slurry is easily vacuum filtered over a Whatman No. 1 filter paper. The weight of the solids recovered is 30.1 grams. The filtrate is raised to 54°C., resulting in a recovery of 590 milliletcrs (98% of original TEA) and 28 milliliters of water.

EXAMPLE IX

Processing waste in the form of a flocculant aqueous mixture containing large amounts of chromium, silicon, calcium and trace amounts of magnesium, zinc, copper, iron, aluminum, manganese, sodium, cadmium, lead, and nickel, is taken as another example. This type of sludge is placed in a centrifuge and centrifuged at 100 rpm. The result is 345 cc. of clear water and 115 cc. of concentrate sludge paste. The 345 cc. of water are separated from the sludge. The 115 cc. of concentrated sludge paste are mixed with 800 cc. of TEA to form a slurry. The temperature of the slurry is lowered to about 10°C. and vacuum filtered through a Whatman No. 1 paper as described above. 7.9 grams of green solids are recovered. The liquid fraction is then raised to 54°C. and maintained at that temperature until complete phase separation occurs. 91 milliliters of water are recovered and 695 milliliters of TEA are recovered. Filtration time is approximately 22 minutes.

EXAMPLE X

A sample of 47.1 grams of duckweed, a samll floating aquatic dicotyledonous plant, is combined with 225 milliliters of TEA. The duckweed and TEA are homogenized in a Waring blender. The temperature of the homogenate is lowered to about 10°C., at which temperature it is filtered over a Whatman No. 1 filter paper under vacuum. Filtration time is approximately 2 minutes. 4.28 grams of solids are recovered. The liquid fraction is raised in temperature to 54°C. After the phases are separated, 188 milliliters of TEA are recovered and 29 milliliters of water are recovered.

Other materials to which the process of the present invention can be applied includes effluent sewage sludge from treatment plants, fish waste, whole fish flesh, spent brewer's yeast, shrimp waste, other shellfish waste, milk, and the like.

Although the present invention has been described in relation to several preferred embodiments, one of the ordinary skill in the art will be able to effect various changes and substitutions of equivalents without departing from the original concept of the invention. It is, therefore, intended that the invention be limited only by the definition contained in the appended claims.

what is claimed is:

1. A method for removing water from a mixture comprising water and particulate solid matter which is insoluble in water comprising:

contacting said mixture with a liquid composition to form a slurry, said composition having an inverse critical solution temperature in a two phase system with water and being selected from a member of or mixtures of members of the groups of amines having the formula

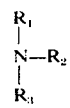

wherein
$R_1$ is a hydrogen or an alkyl radical, and
$R_2$ and $R_3$ are alkyl radicals having from one to six carbon atoms or alkenyl radicals having from two to six carbon atoms.

the total number of carbon atoms in the amine molecule being in the range of from three to seven, inclusive, and said composition being present in said slurry in an amount of at least the critical solution concentration at which substantially all of said water in said mixture is completely miscible in a single liquid phase in said composition, mechanically separating said slurry into a solid fraction comprising solid matter which is insoluble in said slurry and a liquid fraction comprising at least a portion of said water and said composition while maintaining the temperature of said slurry at a temperature at which said water and composition are present in a single liquid phase, after separating said solid fraction, increasing the temperature of said liquid fraction to a temperature above said inverse critical solution to form two liquid phases comprising a composition phase containing a small amount of water and a water phase containing a small amount of composition, and thereafter mechanically separating said water phase from said composition phase.

2. The method of claim 1 wherein said amines are selected from triethylamine or diisopropylamine.

3. The method of claim 1 where the temperature during separation of the solid fraction and liquid fraction is at least as low as the inverse critical solution temperature of said composition with water.

4. The method of claim 3 wherein the proportions of said composition to said water are in the range of one to seven parts by weight of said composition to one part by weight of water.

5. The method of claim 1 wherein said composition comprises triethylamine, the temperature of separation of said fractions being maintained below about 19°C.

6. The method of claim 1 comprising mechanically separating said slurry by filtration.

7. The method of claim 1 comprising:
mechanically separating said slurry by vacuum filtration.

8. The method of claim 1 further comprising:
recycling said composition phase for contacting with additional amounts of said mixture.

9. The method of claim 1 further comprising:
separating from said water phase at least a portion of said composition in solution therewith, and
recycling said portion of said composition for contacting with additional amounts of said mixture.

10. The method of claim 9 wherein said composition is separated from said water phase by steam stripping said composition from said water phase.

11. A method for removing water from fecal matter comprising:
combining fecal matter with a composition having an inverse critical solution temperature in a two phase system with water to form a slurry, said composition being selected from a member of or mixtures of members of the group of amines having the formula

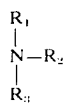

wherein $R_1$ is a hydrogen or an alkyl radical, and
$R_2$ and $R_3$ are alkyl radicals having from one to six carbon atoms or alkenyl radicals having from two to six carbon atoms,
the total number of carbon atoms in the amine molecule being in the range of from three to seven, inclusive, said composition being combined with said fecal matter in an amount in the range of from one to seven parts by weight of said composition to one part by weight of water present in said fecal matter, and mechanically separating said slurry into a solid fraction comprising solid matter from said fecal matter which is insoluble in said slurry and a liquid fraction comprising at least a portion of said water and said composition, said separating being conducted while maintaining the temperature of said slurry below the inverse critical solution temperature of said composition.

12. The method of claim 11 wherein said fecal matter comprises treated sewage sludge.

13. The method of claim 11 wherein said fecal matter comprises poultry feces.

14. The method of claim 13 further comprising:
raising the temperature of said liquid fraction above said inverse critical solution temperature to form two liquid phases comprising a water phase and a composition phase, and
mechanically separating said water phase from said composition phase.

15. The method of claim 14 wherein said poultry feces contain a component soluble in water and insoluble in said composition, the step further comprising:
separating said component from said water phase.

16. The method of claim 15 wherein urea is separated from said water phase.

17. The method of claim 15 wherein water soluble salts are separated from said water phase.

18. The method of claim 14 wherein uric acid is separated from said water phase.

19. The method of claim 14 wherein said poultry feces contain a component insoluble in water and soluble in said composition, the method further comprising:
separating said component from said composition phase.

20. The method of claim 19 wherein vitamin B-12 is separated from said composition phase.

21. The method of claim 19 further comprising:
recycling said composition phase for contacting with additional poultry feces.

22. A method for removing water from a sludge comprising water and solid material which is insoluble in water comprising:
contacting said sludge with a composition having an inverse critical solution temperature in a two phase system with water to form a slurry, said composition being selected from a member of or mixtures of members of the group of amines having the formula

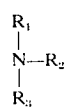

wherein
$R_1$ is a hydrogen or an alkyl radical, and $R_2$ and $R_3$ are alkyl radicals having from one to six carbon atoms or alkenyl radicals having from two to six carbon atoms, the total number of carbon atoms in the amine molecule being in the range of from three to seven, inclusive, said composition being contacted with said sludge in an amount in the range of from one to seven parts by weight of said composition to one part by weight of water present in said sludge, and mechanically separating said slurry into a solid fraction comprising solid matter from said sludge which is insoluble in said slurry and a liquid fraction comprising at least a portion of said water and said composition, said separating being conducted while maintaining the temperature of said slurry below the inverse critical solution temperature of said composition.

23. The method of claim 22 further comprising:

after separating said solid fraction, increasing the temperature of said liquid fraction to form two liquid phases comprising a water phase containing a small amount of composition and a composition phase containing a small amount of water, and mechanically separating said water phase from said composition phase.

24. The method of claim 23 wherein the temperature to which said liquid fraction is increased is one at which the ratio of said composition to said water in said water phase is less than about 1 to 10.

25. The method of claim 24 wherein said composition is triethylamine.

26. The method of claim 25 wherein the temperature of said liquid fraction is increased to above 35°C.

27. The method of claim 26 wherein the temperature of said liquid fraction is increased to the range of from about 50°C to about 70°C.

28. The method of claim 23 further comprising:

recycling said composition phase to contact additional amounts of said mixture.

29. The method of claim 28 further comprising:

stripping said composition remaining miscible in said water phase from said water phase, and recycling said composition so stripped to contact additional amounts of said mixture.

30. The method of claim 23 wherein said mixture comprises a component other than water soluble in said composition, said method further comprising:

treating said composition phase to remove said component.

31. The method of claim 23 wherein said mixture comprises a component soluble in water, said method further comprising:

treating said water phase to remove said component.

32. The method of claim 22 wherein said sludge comprises an inorganic industrial processing waste.

33. The method for separating water and other components from animal protein containing water and solid material insoluble in water comprising:

contacting said animal protein with a composition having an inverse critical solution temperature in a two phase system with water for form a slurry, said composition being selected from a member of or mixtures of members of the group of amines having the formula

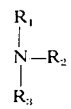

wherein $R_1$ is a hydrogen or an alkyl radical, and $R_2$ and $R_3$ are alkyl radicals having from one to six carbon atoms or alkenyl radicals having from two to six carbon atoms, the total number of carbon atoms in the amine molecule being in the range of from three to seven, inclusive, said composition being contacted with said animal protein in an amount in the range of from one to seven parts by weight of said composition to one part by weight of water present in said animal protein, and mechanically separating said slurry into a solid fraction comprising solid material from said animal protein which is insoluble in said slurry and a liquid fraction comprising at least a portion of said water and said composition, said separating being conducted while maintaining the temperature of said slurry below the inverse critical solution temperature of said composition.

34. The method of claim 33 wherein said animal protein comprises egg shell waste resulting from the removal of the shell from fresh eggs.

35. The method of claim 33 wherein said animal protein comprises egg whites.

36. The method of claim 33 wherein said animal protein comprises whole eggs.

37. The method of claim 33 wherein said animal protein comprises fish processing wastes.

38. The method of claim 33 wherein said animal protein comprises eviscerated fish.

39. The method of claim 33 wherein said animal protein comprises shellfish processing wastes.

40. The method of claim 33 wherein said animal protein comprises milk.

41. The method of claim 33 wherein said animal protein contains a component soluble in said composition, the method further comprising:

raising the temperature of said liquid fraction above said inverse critical solution temperature to form a composition phase containing said component and a water phase, and separating the water phase from said composition phase, and removing said component from said composition phase.

42. The method of claim 41 wherein said component comprises a fatty material.

43. A method for removing water and other components from plant matter containing water and solid material which is insoluble in water comprising:

contacting said plant matter with a composition having an inverse critical solution temperature in a two phase system with water to form a slurry, said composition being selected from a member of or mixtures of members of the group of amines having the formula

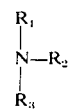

wherein
- $R_1$ is a hydrogen or an alkyl radical, and
- $R_2$ and $R_3$ are alkyl radicals having from one to six carbon atoms or alkenyl radicals having from two to six carbon atoms, the total number of carbon atoms in the amine molecule being in the range of from one to seven, inclusive, said composition being contacted with said plant matter in an amount from one to seven parts by weight of said composition to one part by weight of water present in said plant matter, and mechanically separating said slurry into a solid fraction comprising at least a portion of said solid material which is insoluble in said slurry and a liquid fraction comprising at least a portion of said water and said composition, said separating being conducted while maintaining the temperature of said slurry below the inverse critical solution temperature of said composition.

44. The method of claim 43 wherein said plant matter comprises spent brewer's yeast.

45. The method of claim 43 wherein said plant matter comprises green plants.

46. The method of claim 43 wherein said plant matter contains a component soluble in said composition, the method further comprising:

raising the temperature of said liquid fraction above said inverse critical solution temperature to form a composition phase containing said component and a water phase, and separating the water phase from said composition phase, and removing said component from said composition phase.

47. The method of claim 46 wherein said component comprises a fatty material.

* * * * *